United States Patent
Brown

(10) Patent No.: US 11,565,481 B2
(45) Date of Patent: Jan. 31, 2023

(54) METHOD OF WELDING ADDITIVELY MANUFACTURED THERMOPLASTIC

(71) Applicant: Hamilton Sundstrand Corporation, Charlotte, NC (US)

(72) Inventor: Ricardo O. Brown, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 718 days.

(21) Appl. No.: 16/458,746

(22) Filed: Jul. 1, 2019

(65) Prior Publication Data
US 2021/0001562 A1     Jan. 7, 2021

(51) Int. Cl.
| | |
|---|---|
| B32B 41/00 | (2006.01) |
| B29C 65/08 | (2006.01) |
| B33Y 80/00 | (2015.01) |
| B29C 64/153 | (2017.01) |
| B29C 65/00 | (2006.01) |
| B32B 27/08 | (2006.01) |
| B32B 27/28 | (2006.01) |
| B33Y 40/20 | (2020.01) |
| B29K 71/00 | (2006.01) |

(52) U.S. Cl.
CPC ............ *B29C 65/08* (2013.01); *B29C 64/153* (2017.08); *B29C 66/71* (2013.01); *B29C 66/727* (2013.01); *B29C 66/9513* (2013.01); *B32B 27/08* (2013.01); *B32B 27/285* (2013.01); *B33Y 40/20* (2020.01); *B33Y 80/00* (2014.12); *B29K 2071/00* (2013.01); *B32B 2262/106* (2013.01); *B32B 2305/026* (2013.01)

(58) Field of Classification Search
CPC . B32B 27/08; B32B 27/285; B32B 2262/106; B32B 2305/026; B29C 65/08; B29C 64/153; B29C 66/71; B29C 66/727; B29C 66/9513; B29C 66/30221; B29C 66/30223; B29C 66/712; B29C 66/12443; B29C 66/3022; B33Y 40/20; B33Y 80/00; B33Y 40/00; B29K 2071/00
USPC .................... 156/60, 64, 350, 351, 378, 379
See application file for complete search history.

(56) References Cited

U.S. PATENT DOCUMENTS

| | | |
|---|---|---|
| 8,727,729 B2 | 5/2014 | Noronha et al. |
| 10,086,567 B2 | 10/2018 | Graham et al. |

(Continued)

FOREIGN PATENT DOCUMENTS

| | | | |
|---|---|---|---|
| CN | 109177182 A | 1/2019 | |
| WO | WO-2019025795 A1 * | 2/2019 | ............... B22F 10/00 |

OTHER PUBLICATIONS

Extended European Search Report for EP Application No. 19215214.8, dated Jul. 16, 2020, 11 pages.

(Continued)

*Primary Examiner* — Michael N Orlando
*Assistant Examiner* — Joshel Rivera
(74) *Attorney, Agent, or Firm* — Kinney & Lange, P.A.

(57) ABSTRACT

A method of forming a component includes additively manufacturing a first subcomponent, the first subcomponent including a first polymer material with a first porosity. The method further includes mating the first subcomponent with a second subcomponent and ultrasonically welding the first subcomponent to the second subcomponent at a weld frequency. The first porosity can be 5% or less.

9 Claims, 1 Drawing Sheet

(56) References Cited

U.S. PATENT DOCUMENTS

2011/0240200 A1* 10/2011 Korya ............... B29C 66/43441
                                                          156/60
2015/0112438 A1    4/2015  McLean
2016/0114439 A1    4/2016  Pal et al.
2017/0071083 A1*   3/2017  Mayberry .......... H05K 13/0404

OTHER PUBLICATIONS

J. E. Cillo, Jr., et al., "Proceedings of the American Association of Oral and Maxillofacial Surgeons 2015 Research Summit", from 2016 American Association of Oral and Maxillofacial Surgeons, 74:429-437, 2016.

L. Langau, "Ultrasonic welding 3D printed parts", from <http://www.makepartsfast.com/how-to-ultrasonically-weld-3d-printed-parts/, 15 pages, Oct. 2016.

Communication Pursuant to Article 94(3) EPC for EP Application No. 19215214.8,, dated Aug. 26, 2022, 6 pages.

F. Andreola, et al., "Techniques Used to Determine Porosity", from The American Ceramic Society Bulletin, Jul. 2000, 5 pages.

R. Zaleski, et al., "Porosity of polymer materials by various techniques", from J. Porous Matter, 2009, pp. 691-698.

* cited by examiner

METHOD OF WELDING ADDITIVELY MANUFACTURED THERMOPLASTIC

BACKGROUND

The present invention relates to the fabrication of thermoplastic components, and more particularly, to a method of bonding thermoplastic subcomponents.

One method for bonding thermoplastic components formed by selective laser sintering (SLS) includes adhesive bonding. Adhesive bonding requires additional manufacturing time for surface prep, curing, and fixturing. Further, the strength of adhesive bond joints depends on adhesive strength and thickness of the bond line. Welding methods, such as ultrasonic welding, can provide stronger bond joints than adhesive methods, but ultrasonic welding is not typically performed on SLS-formed components due to the relatively high porosity of such components.

SUMMARY

A method of forming a component includes additively manufacturing a first subcomponent, the first subcomponent including a first polymer material with a first porosity. The method further includes mating the first subcomponent with a second subcomponent and ultrasonically welding the first subcomponent to the second subcomponent at a weld frequency. The first porosity can be 5% or less.

A component includes a first subcomponent, a second subcomponent, and a weld joint connecting the first subcomponent to the second subcomponent. The first subcomponent includes a first polymer material with a first porosity of 5% or less.

The present summary is provided only by way of example, and not limitation. Other aspects of the present disclosure will be appreciated in view of the entirety of the present disclosure, including the entire text, claims, and accompanying figures.

Figure 1:
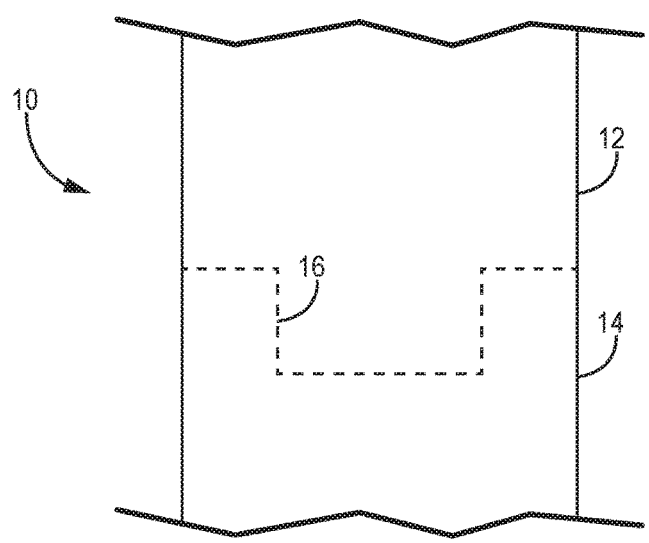
FIG. 1 is a simplified cross-sectional view of a component with the weld joint indicated with dashed lines.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A method of welding an additively manufactured polymer-based component to a second component is disclosed herein. The method includes producing a first polymer-based subcomponent with a porosity of 5% or less. The first subcomponent is subsequently mated with and ultrasonically welded to a second subcomponent. An energy director or shear joint can be formed into one or more of the subcomponents to facilitate bonding at the weld joint.

FIG. 1 is a simplified cross-section showing component 10. As shown, component 10 is at least partially formed by the joining of first and second subcomponents 12 and 14, respectively. Weld joint 16 between subcomponents 12 and 14 is shown as a dashed line. First subcomponent 12 can be formed from a polymer material such as a thermoplastic. In an exemplary embodiment, first subcomponent 12 can be formed from a polyetherketoneketone (PEKK) material which may, in some embodiments, include reinforcing carbon fibers. First subcomponent 12 can be formed using an additive manufacturing technique suitable for polymers, such as selective laser sintering (SLS), but other suitable processes are contemplated herein. First subcomponent 12 can be manufactured such that it has a porosity of 5% or less. Second subcomponent 14 can be formed in the same, or substantially similar manner to that of first subcomponent 12. For example, second subcomponent 14 can also be an additively manufactured PEKK component having a porosity of 5% or less. In an alternative embodiment, second subcomponent 14 can be formed from another material, such as polyetheretherketone (PEEK), and/or formed using a different manufacturing technique. The design and composition of the individual subcomponents can be based on the specifications and requirements of component 10.

Figure 1A:
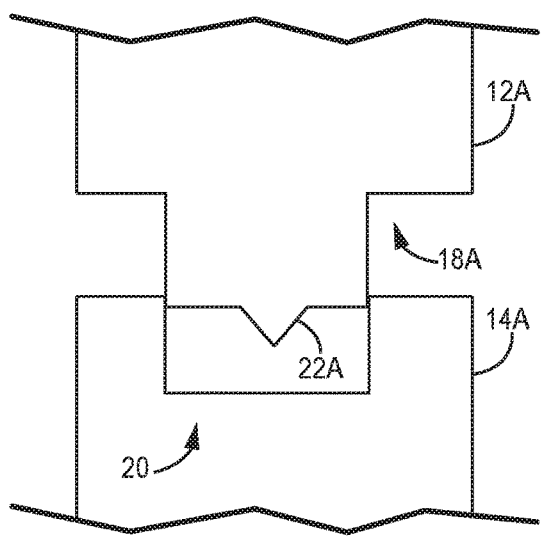
FIG. 1A is a simplified cross-sectional view of showing an embodiment of two subcomponents used to form the component prior to welding.
Figure 1B:
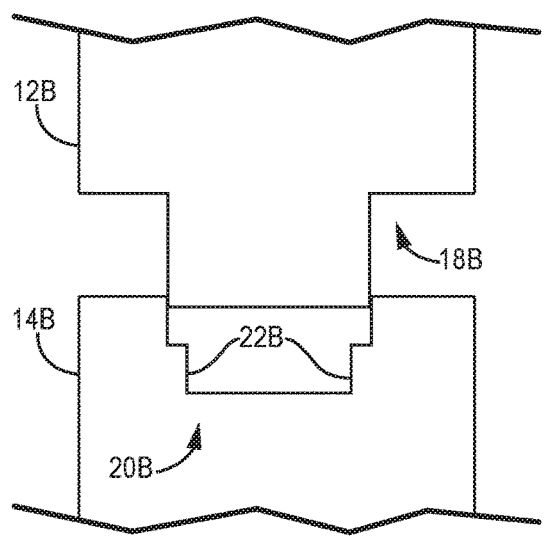
FIG. 1B is a simplified cross-sectional view showing an alternative embodiment of two subcomponents used to form the component prior to welding.

FIGS. 1A and 1B are simplified cross-sections showing alternative embodiments of first subcomponent 12 and second subcomponent 14 partially mated and prior to welding. The subcomponents (12A, 14A, 12B, 14B) shown in FIGS. 1A and 1B, respectively, are substantially similar to subcomponents 12 and 14 of FIG. 1, with respect to material and manufacture. In the embodiments of FIGS. 1A and 1B, first subcomponent 12A, 12B can include an interface region 18A, 18B designed to mate with interface region 20A, 20B of second subcomponent 14A, 14B. As shown, the interface regions have a tongue-and-groove design, but other interface geometries (e.g., butt joint, step joint, etc.) are contemplated herein.

The embodiments of FIGS. 1A and 1B differ from one another in joint design. In FIG. 1A, first subcomponent 12A is formed with a triangular energy director joint 22A that can be a continuous structure or discretely placed along interface region 18A. Energy director joint can be incorporated into first subcomponent 12A during the additive manufacturing process if uniformity with the rest of first subcomponent 12A is desired. Energy director joint 22A can alternatively be located on another surface of interface region 18A, or on a surface of interface region 20A. The use of more than one energy director joint 22A along interface region 18A and/or 20A is also possible. Generally speaking, the size, number, and angle of energy director joint 22A can be selected based on the area of the interface regions to be joined. In the embodiment of FIG. 1B, second subcomponent 14B includes a shear joints 22B in the form of extra material added to interface region 20B. Like energy director joint 22A, shear joints 22B can be additively manufactured along with second subcomponent 14B. Further, second subcomponent 14B can include only one, or more than two shear joints, and first subcomponent 12B can additionally or alternatively include one or more shear joints 22B. An alternative embodiment of either FIG. 1A or 1B can also include a combination of energy director and shear joints.

The implementation of either an energy director joint or a shear joint can depend on the material used to form one or both of the subcomponents. For example, energy director joints may be preferred with amorphous materials, while shear joints may be preferred with semi-crystalline materials due to their tendency to fluctuate between the molten and solid state over a narrow temperature range. However, it should be understood that either type of join can be used with both amorphous and semi-crystalline materials. Shear joints tend to form stronger joints between subcomponents because of the greater amount of material displaced and welded and can be selected for applications requiring hermetic seals. The greater amount of material can lead to greater weld flash, so the shear joint may not be ideal for certain components and/or application.

With continued reference to FIGS. 1A and 1B, the first and second subcomponents (12A, 14A and/or 12B, 14B) can be aligned and mated at the interface regions to be ultrasonically welded. The subcomponents can be held together in the welding apparatus, and a horn brought into physical contact with one of the subcomponents vibrates at high frequency (e.g., between 15 and 25 kHz) for a period of time to sufficiently melt the surfaces of the interface regions together. The first and second subcomponents can then be held together under pressure while the subcomponents cool and solidify to form weld joint 16 (FIG. 1). The weld frequency and weld time can depend on factors such as subcomponent material and size, and joint design, as each will affect the degree of melting at the interface regions. Further, greater component porosity can dampen vibrations during and interfere with the welding process, which is why a component porosity of 5% or less is preferred.

The resulting component 10 can increased strength at the weld joint over components that are adhesively bonded because of the joining of similar/identical materials at the weld joint. Further, ultrasonic welding generally takes less time than adhesive bonding which requires additional steps such as bond surface preparation and adhesive curing. Additive manufacturing of the subcomponents can allow for highly customizable joint designs and interface region geometries. Component 10 can further include more than two subcomponents joint via ultrasonic welding, or using a combination of bonding techniques. Component 10 can be, for example, a siphon tube or housing structure for use in industrial, aerospace, and other transportation applications.

Discussion of Possible Embodiments

The following are non-exclusive descriptions of possible embodiments of the present invention.

A method of forming a component includes additively manufacturing a first subcomponent, the first subcomponent including a first polymer material with a first porosity. The method further includes mating the first subcomponent with a second subcomponent and ultrasonically welding the first subcomponent to the second subcomponent at a weld frequency. The first porosity can be 5% or less.

The method of the preceding paragraph can optionally include, additionally and/or alternatively, any one or more of the following features, configurations and/or additional components:

In the above method, the second subcomponent can include a second polymer material with a second porosity.

In any of the above methods, the first polymer material can be a thermoplastic material.

In any of the above methods, the second polymer material can be the same as the first polymer material.

In any of the above methods, the thermoplastic can be polyetherketoneketone (PEKK).

In any of the above materials, the second porosity can be the same as the first porosity.

In any of the above materials, the mating step can include aligning a first subcomponent interface region with a second subcomponent interface region.

In any of the above materials, one of the first and second subcomponent interface regions can include an energy director joint.

In any of the above materials, one of the first and second subcomponent interface regions can include a shear joint.

In any of the above materials, the weld frequency can range from 15 to 25 kHz.

In any of the above materials, the first subcomponent can be additively manufactured using a selective laser sintering (SLS) technique.

A component includes a first subcomponent, a second subcomponent, and a weld joint connecting the first subcomponent to the second subcomponent. The first subcomponent includes a first polymer material with a first porosity of 5% or less.

The component of the preceding paragraph can optionally include, additionally and/or alternatively, any one or more of the following features, configurations and/or additional components:

In the above component, the second subcomponent can include a second polymer material with a second porosity.

In any of the above components, the first polymer material can be a thermoplastic material.

In any of the above components, the second polymer material can be the same as the first polymer material.

In any of the above components, the thermoplastic can be polyetherketoneketone (PEKK).

In any of the above components, the PEKK material can be reinforced with carbon fibers.

In any of the above components, the second porosity can be the same as the first porosity.

In any of the above components, the weld joint can be free of adhesive materials.

In any of the above components, the first subcomponent can be formed using a selective laser sintering (SLS) technique.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a component, the method comprising:
   additively manufacturing a first subcomponent, the first subcomponent comprising a first polymer material with a first porosity;
   additively manufacturing a second subcomponent, the second subcomponent comprising a second polymer material with a second porosity;
   additively manufacturing, onto an interface region of at least one of the first subcomponent and the second subcomponent using, respectively, at least one of the first polymer material and the second polymer material, at least one of:
      an energy director joint formed on and extending away from the respective interface surface; and a shear joint formed on the respective interface surface;
mating the first subcomponent with the second subcomponent at the interface region of each of the first subcomponent and the second subcomponent; and
ultrasonically welding the first subcomponent to the second subcomponent at a weld frequency;
wherein at least one of the first porosity and the second porosity is 5% or less.

2. The method of claim 1, wherein the first polymer material is a thermoplastic material.

3. The method of claim 2, wherein the second polymer material is the same as the first polymer material.

4. The method of claim 3, wherein the thermoplastic material is polyetherketoneketone (PEKK).

5. The method of claim 1, wherein the second porosity is the same as the first porosity.

6. The method of claim 1, wherein the weld frequency ranges from 15 to 25 kHz.

7. The method of claim 1, wherein at least one of the first subcomponent and the second subcomponent is additively manufactured using a selective laser sintering (SLS) technique.

8. The method of claim 1, wherein the second polymer material is a thermoplastic material.

9. The method of claim 8, wherein the thermoplastic material is one of polyetherketoneketone (PEKK) and polyetheretherketone (PEEK).

* * * * *